United States Patent Office 3,810,898
Patented May 14, 1974

---

3,810,898
COUMARIN-7-YLOXY-ALKYL PIPERAZINE COMPOUNDS
Ernst-Christian Witte, Mannheim, Kurt Stach, Mannheim-Waldhof, Max Thiel, Mannheim, and Androniki Roesch and Egon Roesch, Lampertheim, Germany, assignors to Boehringer Mannheim GmbH, Mannheim, Germany
No Drawing. Filed Apr. 19, 1972, Ser. No. 245,607
Claims priority, application Germany, May 14, 1971,
P 21 23 924.7
Int. Cl. C07d 51/70
U.S. Cl. 260—268 BC
16 Claims

ABSTRACT OF THE DISCLOSURE

Certain novel 4-[ω-(coumarin-7-yloxy)-alkyl]-piperazine compounds of the formula:

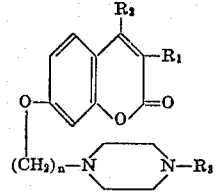

wherein $R_1$ is hydrogen atom or a lower alkyl; $R_2$ is lower alkyl; $R_3$ is an unsubstituted or substituted phenyl or benzyl radical, the substituents, when present, being halogen or lower alkyl or alkoxy groups, and $n$ is 1, 2 or 3; and the pharmacologically compatible salts thereof, have outstanding anti-oedematous activity and reduce increased capillary permeability.

---

The present invention is concerned with novel 4-[ω-(coumarin-7-yloxy)-alkyl]-piperazine compounds and with the preparation thereof and is also concerned with pharmaceutical compositions containing these new compounds.

The new 4-[ω-(coumarin-7-yloxy)-alkyl]-piperazine compounds according to the present invention are of the formula:

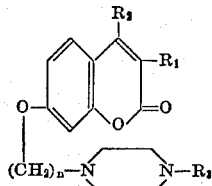

wherein $R_1$ is hydrogen atom or a lower alkyl; $R_2$ is lower alkyl; $R_3$ is an unsubstituted or substituted phenyl or benzyl radical, the substituents, when present, being halogen or lower alkyl or alkoxy groups, and $n$ is 1, 2 or 3; and the pharmacologically compatible salts thereof. The terms "lower alkyl" a "lower alkoxy" refer to radicals containing from 1 to about six carbon atoms.

The new Compounds I according to the present invention have an anti-oedematous action and reduce increased capillary permeability. They can also suppress the liberation or the action of histamine and serotonin and thus also have an anti-inflammatory and anti-allergic action.

The new Compounds I according to the present invention can be prepared, for example, by one of the following methods:

(a) condensation of compounds of the general formula:

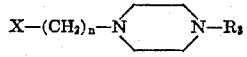

wherein $n$ and $R_3$ have the same meanings as above and X is a reactive radical, with compounds of the general formula:

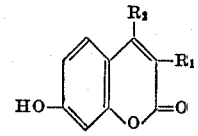

wherein $R_1$ and $R_2$ have the same meanings as above; or (b) condensation of compounds of the general formula:

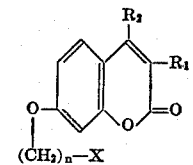

wherein $R_1$, $R_2$ X and $n$ have the same meanings as above, with compounds of the general formula:

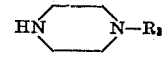

wherein $R_3$ has the same meaning as above; or (c) when $R_3$ is to be an unsubstituted or substituted benzyl radical, condensation of compounds of the general formula:

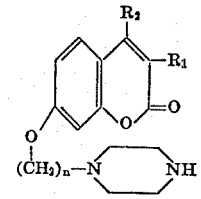

wherein $R_1$, $R_2$ and $n$ have the same meanings as above, with compounds of the general formula $X.R_3$, wherein X has the same meaning as above and $R_3$ is an unsubstituted or substituted benzyl radical; or (d) condensation of compounds of the general formula:

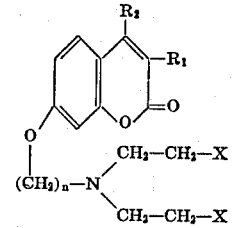

wherein $R_1$, $R_2$, X and $n$ have the same meanings as above, with compounds of the general formula:

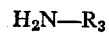

wherein $R_3$ has the same meaning as above; whereafter, if desired, the products obtained are converted into their physiologically compatible salts.

The reactive radical X in the above-given general formulae is preferably a halogen atom.

In order to remove the acid HX liberated during the course of the condensation reactions, it is preferred to carry out the condensation reactions in the presence of an acid-binding agent, for example an alkalimetal or alkaline earth metal carbonate or hydroxide. It is also possible to use one of the reaction components in the form of a salt.

The condensation is preferably carried out in an inert solvent, for example, acetone, methyl ethyl ketone, dimethylformamide, dimethyl sulphoxide, an alcohol or an aromatic hydrocarbon, such as benzene or toluene.

For the preparation of salts with pharmacologically compatible organic or inorganic acids, for example, hydrochloric acid, sulphuric acid, phosphoric acid, lactic acid, citric acid or an alkylsulphonic acid, the Compounds I are reacted with the appropriate acids.

For the preparation of pharmaceutical compositions, the Compounds I according to the present invention are mixed with solid or liquid pharmaceutical diluents or carriers, which may also contain odoriferous, flavoring and coloring materials and may be in the form of, for example, tablets or dragées or, with the addition of appropriate adjuvants, can also be suspended or dissolved in water or in an oil, for example olive oil.

The following examples are given for the purpose of illustrating the present invention:

EXAMPLE 1

Preparation of 1-benzyl-4-[3-(3,4-dimethylcoumarin-7-yloxy)-propyl]-piperazine

A mixture of 28.5 g. (0.15 mole) 7-hydroxy-3,4-dimethyl-coumarin, 22.8 g. (0.165 mole) powdered potassium carbonate and 750 ml. anhydrous methyl ethyl ketone was heated under reflux for 2 hours, while stirring, then cooled somewhat. 1 g. potassium iodide was added thereto and a solution of 41.6 g. (0.165 mole) 1-(3-chloropropyl)-4-benzyl-piperazine in 300 ml. anhydrous methyl ethyl ketone was added thereto dropwise over the course of 30 minutes, whereafter the reaction mixture was stirred for 15 hours at reflux temperature. Solid material was then filtered off with suction, the filtrate was evaporated in a vacuum and the residue was taken up in chloroform (or in some other solvent which is immiscible with water). The filter cake was dissolved in water and the aqueous phase extracted with chloroform (or with some other solvent which is immiscible with water). The organic phases are then combined, extracted several times with 1 N aqueous sodium hydroxide solution, washed with water until neutral, dried over anhydrous sodium sulphate and the solvent evaporated in a vacuum. The remaining crude product (about 62.5 g.) was recrystallized from isopropanol. There are obtained 46.8 g. (77% of theory) 1-benzyl - 4 - [3-(2,4-dimethylcoumarin-7-yloxy)-propyl]-piperazine, which had a melting point of 154–155° C.

The corresponding hydrochloride, prepared in the conventional manner had a melting point of 266–268° C., after recrystallization from 90% ethanol.

The following compounds are obtained in an analogous manner 1-(2-chlorobenzyl)-4-[3-(4-methylcoumarin-7-yloxy)-propyl]-piperazine from 1-(3-chloropropyl)-4-(2-chlorobenzyl) - piperazine and 7-hydroxy-4-methyl-coumarin; yield 43% of theory; M.P. 98–100° C., after recrystallization from ethyl acetate; dihydrochloride: M.P. 252–254° C., after recrystallization from methanol;

1-phenyl-4-[3-(3,4-dimethylcoumarin-7-yloxy)-propyl]-piperazine from 1-(3-chloropropyl)-4-phenyl-piperazine and 7-hydroxy-3,4-dimethylcoumarin; yield 65% of theory; M.P. 144–146° C., after recrystallization from isopropanol; hydrochloride: M.P. 226–228° C., after recrystallization from aqueous ethanol;

1-(2-chlorobenzyl)-4-[3-(3,4-dimethylcoumarin-7-yloxy)-propyl]-piperazine from 1-(3-chloropropyl)-4-(2-chlorobenzyl) - piperazine and 7-hydroxy-3,4-dimethylcoumarin; yield 65% of theory; M.P. 89–90° C., after recrystallization from isopropanol; dihydrochloride: M.P. 251–252° C., after recrystallization from aqueous methanol;

1-(4-chlorobenzyl)-4-[3-(3,4-dimethylcoumarin-7-yloxy)-propyl]-piperazine from 1-(3-chloropropyl) - 4 - (4-chlorobenzyl)-piperazine and 7-hydroxy-3,4-dimethylcoumarin; yield 86% of theory; M.P. 112–114° C., after recrystallization from isopropanol; dihydrochloride: M.P. 266–268° C., after recrystallization from aqueous ethanol;

1-(2-methylbenzyl)-4-[3-(3,4-dimethylcoumarin-7-yloxy)-propyl]-piperazine from 1-(3-chloropropyl) - 4 - (2-methylbenzyl)-piperazine and 7-hydroxy-3,4-dimethylcoumarin; yield 94% of theory; M.P. 109–110° C., after recrystallization from isopropanol; dihydrochloride: M.P. 242–243° C., after recrystallization from aqueous ethanol.

EXAMPLE 2

Preparation of 1-phenyl-4-[3-(4-methylcoumarin-7-yloxy)-propyl]-piperazine 4.0 g. (0.1 mole) powdered sodium hydroxide were suspended in 150 ml. isopropanol, 17.6 g. (0.1 mole) 7-hydroxy-4-methyl-coumarin were added thereto and the mixture warmed to 40° C. for 30 minutes, while stirring. Thereafter, 1 g. potassium iodide was added and, in the course of 30 minutes, a solution of 23.9 g. (0.1 mole) 1-(3-chloropropyl)-4-phenyl-piperazine in 50 ml. isopropanol added dropwise. After boiling under reflux for 12 hours, the reaction mixture is suction filtered while still warm, the filtrate substantially evaporated in a vacuum, the residue dissolved in chloroform and the chloroform phase shaken out several times with 1 N sodium hydroxide solution and subsequently washed with water until neutral. After drying over anhydrous sodium sulphate, the solution was evaporated. The residue was heated under oil pump vacuum at 80° C., then dissolved in ethyl acetate and precipitated by the addition of ether containing hydrogen chloride. There was thus obtained 26% of theory of the hydrochloride of 1-phenyl-4-[3-(4-methylcoumarin-7-yloxy)-propyl]-piperazine which, after recrystallization from aqueous ethanol, melts at 253° C.

EXAMPLE 3

Preparation of 1-(2-methylphenyl)-4-[3-(4-methylcoumarin-7-yloxy)-propyl]-piperazine A mixture of 17.6 (0.1 mole) 7-hydroxy-4-methylcoumarin, 16 g. powdered potassium carbonate and 500 ml. acetone was stirred at reflux temperature for 2 hours and then cooled. 1 g. potassium iodide was added thereto, a solution of 0.1 mole 1-(3-chloropropyl)-4-(2-methylphenyl)-piperazine in 100 ml. acetone was slowly added dropwise and the reaction mixture then heated, with stirring, at reflux temperature for 12 hours. The reaction mixture was then worked up in a manner analogous to that described in Example 1. There was obtained a yield of 40% of theory of 1-(2-methylphenyl)-4-[3-(4-methylcoumarin-7-yloxy)-propyl]-piperazine which, after recrystallization from isopropanol, melted at 113–155° C. The corresponding hydrochloride, after recrystallization from isopropanol, melted at 241–243° C.

The following compounds are obtained in an analogous manner:

1-(2-chlorophenyl)-4-[3-(4-methylcoumarin-7-yloxy)-propyl]-piperazine from 1-(3-chloropropyl)-4-(2 - chlorophenyl) - piperazine and 7-hydroxy-4-methylcoumarin; yield 25% of theory; M.P. 133–135° C., after recrystallization from ethyl acetate; hydrochloride: M.P. 248–249° C., after recrystallization from ethanol;

1-(4-chlorophenyl)-4-[3-(4-methylcoumarin-7-yloxy)-propyl]-piperazine from 1-(3-chloropropyl) - 4 - (4-chlorophenyl)-piperazine and 7-hydroxy-4-methylcoumarin; yield 29% of theory;

M.P. 164–165° C., after recrystallization from ethyl acetate; hydrochloride: M.P. 197–199° C., after recrystallization from ethanol;

1-(2-methoxyphenyl)-4-[3-(4-methylcoumarin-7-yloxy)-propyl]-piperazine from 1-(3-chloropropyl)-4-(2-methoxyphenyl)-piperazine and 7-hydroxy-4-methylcoumarin; yield 43% of theory; M.P. 123–125° C., after recrystallization from isopropanol; dihydrochloride: M.P. 220–222° C., after recrystallization from ethanol;

1-benzyl-4-[3-(4-methylcoumarin-7-yloxy)-propyl]-piperazine from 1-(3-chloropropyl) - 4 - benzyl - piperazine and 7-hydroxy-4-methylcoumarin; yield 66% of theory; M.P. 118–120° C., after recrystallization from benzene/cyclohexane;

1-(2-methoxybenzyl)-4-[3-(3,4-dimethylcoumarin-7-yloxy)-propyl]-piperazine from 1-(3-chloropropyl)-4-(2-methoxybenzyl)-piperazine and 7-hydroxy-3,4-dimethylcoumarin; yield 45% of theory; M.P. 116–117° C., after recrystallization from isopropanol; dihydrochloride: M.P. 245° C., after recrystallization from aqueous ethanol;

1-(2-chlorobenzyl)-4-[2-(3,4-dimethylcoumarin-7-yloxy)-ethyl]-piperazine from 1-(2-chloroethyl) - 4 - (2-chlorobenzyl)-piperazine and 7-hydroxy - 3,4 - dimethylcoumarin; yield 38% of theory; M.P. 105–107° C., after recrystallization from isopropanol; dihydrochloride: M.P. 277–280° C., after recrystallization from aqueous ethanol;

1-(2-methoxybenzyl)-4-[2-(4-methylcoumarin-7-yloxy)-ethyl]-piperazine from 1-(2 - chloroethyl)-4-(2-methoxybenzyl)-piperazine and 7-hydroxy-4-methylcoumarin; yield 55% of theory; dihydrochloride: M.P. 251–253° C., after recrystallization from methanol;

1-(2-methoxybenzyl)-4-[3-(4-methylcoumarin-7-yloxy)-propyl]-piperazine from 1-(3-chloropropyl)-4-(2-methoxybenzyl)-piperazine and 7-hydroxy-4-methylcoumarin; yield 69% of theory; dihydrochloride: M.P. 245–247° C., after recrystallization from methanol/ether;

1-(4-methoxyphenyl)-4-[3-(4-methylcoumarin-7-yloxy)-propyl]-piperazine from 1-(3-chloropropyl)-4-(4-methoxyphenyl)-piperazine and 7-hydroxy-4-methylcoumarin; yield 57% of theory; M.P. 154–156° C., after recrystallization from ethyl acetate; hydrochloride: M.P. 224–226° C.;

1-(3-methoxyphenyl)-4-[3-(4-methylcoumarin-7-yloxy)-propyl]-piperazine from 1-(3-chloropropyl)-4-(3-methoxyphenyl)-piperazine and 7-hydroxy-4-methylcoumarin; yield 54% of theory; M.P. 115–116° C., after recrystallization from ethyl acetate/ligroin; hydrochloride: M.P. 192–194° C.

The new compounds of this invention have anti-oedematous activity and reduce increased capillary permeability. They can suppress the liberation, or the activity, of histamine and serotonin and, thus, also have an anti-inflammatory and anti-allergic action.

Benzarone, a substance commercially available under the trademark "Fragivix," [=2-ethyl - 3 - (4'-hydroxy-benzoyl)-benzofuran], for the treatment of damage to the peripheral capillary vascular wall, was used as a comparison compound.

As the test method there was used the generalized dextran edema of the rat. This method is based on the fact that certain rat strains, upon a single application of dextran (300 mg./kg. i.p.), react in a way similar to anaphylaxis, characterized by itching and the development of edema. An increased discharge of plasma albumin from the blood into the tissue is related to the discharge of water from the blood vessels which results in the formation of edema at the paws, nose, ears, lips, tongue, tail and outer genitals of the animals.

The edemas at the acres can be determined visually on a point scale, the amount of the albumin discharge can be estimated by means of the dye Evans Blue administered intravenously prior to the dextran (0.1 ml./100 g. of a 1.8% Evans Blue solution), since this dye combines with the plasma albumin to form a stable dye albumin complex. Depending on the quantity of albumin discharge, the edema exhibited a more or less strong blue coloration. The same is also evaluated on a point scale.

The test compounds were injected twice intraperitoneally, either as a solution in physiologically pure sodium chloride solution, or as a suspension in 1% methyl cellulose (with the exception of Benzarone which was administered in 0.5% methyl cellulose with addition of 0.4% of Cremophor EL), one hour before and 30 minutes after the administration of Evans Blue and dextran. Their effectiveness was detectable by the inhibition of edema and color discharge in a group of ten male rats treated with the test compound relative to a control group of ten male rats treated only with Evans Blue and dextran (i.p. the solvent only (1 ml./100 g.).

The difference between the results in these two groups, as evidenced by inhibition of edemas and the color discharge (expressed as percent inhibition) is set forth in the table below:

TABLE.—ACTION ON THE GENERALIZED DEXTRAN EDEMA (ANAPHYLACTOID REACTIONS) IN RATS

[All percentages given are significant as compared to the untreated control animals ($p<0.05$)]

| Test compound | Dosage, mg./kg. | Edemas, percent inhibition | Color discharge, percent inhibition |
|---|---|---|---|
| 1-phenyl-4-[3-(4-methyl-coumarin-7-yl-oxy)-propyl]-piperazine [1] | 6 | 25 | 25 |
| 1-benzyl-4-[3-(4-methyl-coumarin-7-yl-oxy)-propyl]-piperazine | 12 | 26 | 19 |
| 1-(2-chlorobenzyl)-4-[3-(4-methyl-coumarin-7-yl-oxy)-propyl]-piperazine | 6 | 37 | 34 |
| 1-(2-chlorobenzyl)-4-[3-(3,4-dimethyl-coumarin-7-yl-oxy)-propyl]-piperazine | 12 | 72 | 62 |
| 1-(2-chlorophenyl)-4-[3-(4-methyl-coumarin-7-yl-oxy)-propyl]-piperazine | 3 | 32 | 18 |
| 1-(2-methoxyphenyl)-4-[3-(4-methyl-coumarin-7-yl-oxy)-propyl]-piperazine | 1 | 43 | 38 |
| 1-(4-chlorophenyl)-4-[3-(4-methyl-coumarin-7-yl-oxy)-propyl]-piperazine | 12 | 38 | 33 |
| 1-benzyl-4-[3-(3,4-dimethyl-coumarin-7-yl-oxy)propyl]-piperazine | 24 | 44 | 43 |
| 1-(2-methylphenyl)-4-[3-(4-methyl-coumarin-7-yl-oxy)-propyl]-piperazine | 6 | 46 | 30 |
| 1-phenyl-4-[3-(3,4-dimethyl-coumarin-7-yl-oxy)-propyl]-piperazine | 12 | 44 | 37 |
| 1-(4-chlorobenzyl)-4-[3-(3,4-dimethyl-coumarin-7-yl-oxy)-propyl]-piperazine | 12 | 50 | 34 |
| 1-(2-methoxybenzyl)-4-[3-(3,4-dimethyl-coumarin-7-yl-oxy)-propyl]-piperazine | 6 | 40 | 36 |
| 1-(2-methylbenzyl)-4-[3-(3,4-dimethyl-coumarin-7-yl-oxy)-propyl]-piperazine | 12 | 48 | 41 |
| 1-(2-chlorobenzyl)-4-[2-(3,4-dimethyl-coumarin-7-yl-oxy)ethyl]-piperazine | 12 | 41 | 38 |
| Benzaron [2] | 37.5 | 15 | 36 |
| | 75 | 57 | 51 |

[1] This compound was dissolved in 20% fatty oil and 80% distilled water which contained 0.5% of "Cremophor EL."
[2] This compound was administered in 0.5% methyl cellulose with addition of 0.4% of "Cremophor EL."

It can be seen from the above table that the new compounds are substantially more effective than Benzarone, even when used at lower dosages than those used for the standard comparison material.

With respect to the proper dosage and methods of application for the instant compound, these are comparable to those for the commercially known compound "Fragivix," which has been described in connection with the comparative tests set forth in the table above. The instant compounds make possible comprehensive therapy of acute as well as chronic phlebological and capillary afflictions as well as various syndromes. The instant compounds retard reactions leading to edemas and swellings, including those of allergic origin.

The typical daily dosage of 10 to 300 mg. results in reducing or eliminating the above afflictions, commonly within some days. A preferred dosage is 30–100 mg.

It will be understood that the specification and examples are illustrative but not limitative of the present invention and that other embodiments within the spirit and scope of the invention will suggest themselves to those skilled in the art.

What is claimed is:

1. 4-[4-(coumarin - 7 - yloxy)-alkyl]-piperazine compounds of the formula:

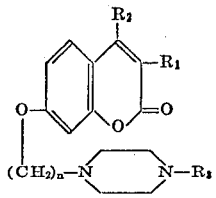

wherein $R_1$ is hydrogen or lower alkyl; $R_2$ is lower alkyl; $R_3$ is phenyl, benzyl, substituted phenyl or substituted benzyl wherein the substituent is one to three halogen, lower alkyl or alkoxy; and $n$ is 1, 2, or 3; and the pharmacologically compatible salts thereof.

2. Compound as claimed in claim 1 wherein $R_1$ is hydrogen.

3. Compound as claimed in claim 1 wherein $R_1$ is alkyl of from 1 to 6 carbon atoms.

4. Compound as claimed in claim 1 wherein $R_2$ is alkyl of from 1 to 6 carbon atoms.

5. Compound as claimed in claim 1 wherein $R_3$ is phenly.

6. Compound as claimed in claim 1 wherein $R_3$ is benzyl.

7. Compound as claimed in claim 1 wherein $R_3$ is substituted phenyl or benzyl wherein the substituent is at least one member of the group consisting of chloro, bromo, fluoro, iodo, alkyl of from 1 to 6 carbon atoms and alkoxy of from 1 to 6 carbon atoms.

8. Compound as claimed in claim 1 wherein $n$ is 1.

9. Compound as claimed in claim 1 wherein $n$ is 2.

10. Compound as claimed in claim 1 wherein $n$ is 3.

11. Compound as claimed in claim 1 designated 1-phenyl-4-[3-(4-methyl - coumarin - 7 - yl-oxy)-propyl]piperazine.

12. Compound as claimed in claim 1 designated 1-(2-chlorobenzyl)-4-[3 - (4 - methyl - coumarin-7-yl-oxy)-propyl]piperazine.

13. Compound as claimed in claim 1 designated 1-(2-chlorophenyl)-4-[3 - (4 - methyl - coumarin-7-yl-oxy)-propyl]piperazine.

14. Compound as claimed in claim 1 designated 1-(2-methoxyphenyl)-4-[3 - (4 - methyl - coumarin-7-yl-oxy)-propyl]piperazine.

15. Compound as claimed in claim 1 designated 1-(2-methylphenyl) - 4 - [3 - (4-methyl-coumarin-7-yl-oxy)-propyl]piperazine.

16. Compound as claimed in claim 1 designated 1-(2-methoxybenzyl)-4-[3-(3,4-dimethyl - coumarin-7-yl-oxy)-propyl]piperazine.

References Cited
UNITED STATES PATENTS

| | | | |
|---|---|---|---|
| 3,052,679 | 9/1962 | Caualini | 260—343.2 R |
| 3,282,938 | 11/1966 | Ritter | 260—343.2 R |
| 3,520,893 | 7/1970 | Beyerle | 260—343.2 |
| 3,538,098 | 11/1970 | Beyerle | 260—268 BC |
| 3,663,570 | 5/1972 | Sato | 260—343.2 R |
| 3,311,636 | 3/1967 | Moffett | 260—268 BC |
| 3,410,851 | 11/1968 | Stauffer | 260—268 BC |
| 3,541,097 | 11/1970 | Beyerle et al. | 260—268 BC |

DONALD G. DAUS, Primary Examiner

U.S. Cl. X.R.

260—268 PH, 343.2 R; 424—250